Dec. 3, 1968
W. H. DORING
3,414,161
HEARING AID BATTERY DISPENSER
Filed April 4, 1967
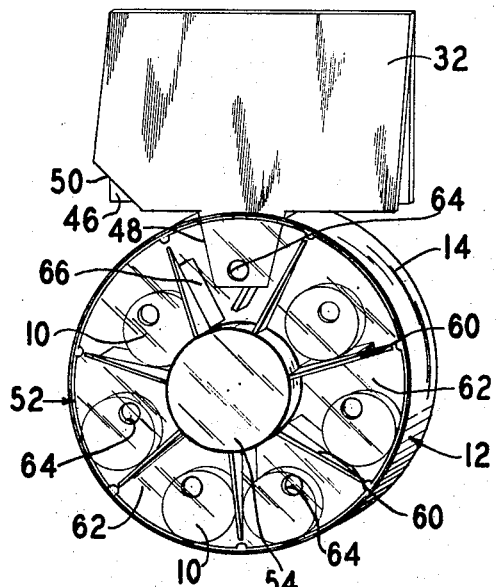
FIG.1.
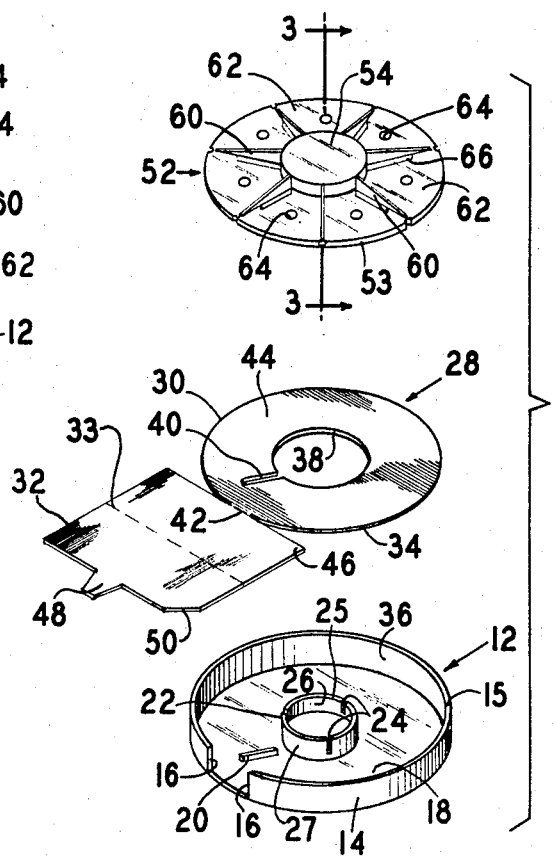
FIG.2.
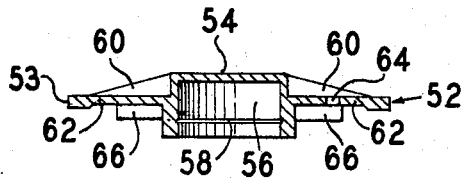
FIG.3.
INVENTOR
WILLIAM H. DORING
BY 
ATTORNEY

United States Patent Office 3,414,161
Patented Dec. 3, 1968

3,414,161
HEARING AID BATTERY DISPENSER
William H. Doring, Old Greenwich, Conn., assignor to Union Carbide Corporation, a corporation of New York
Filed Apr. 4, 1967, Ser. No. 628,357
8 Claims. (Cl. 221—2)

ABSTRACT OF THE DISCLOSURE

A hearing aid battery dispenser of transparent thermoplastic resinous material comprising a pair of circular members which are relatively rotatable to individually dispense said batteries, with a sheet insert having an electrically conductive surface cooperating with orifices in one of the members to enable testing of the batteries in the dispenser.

---

The present invention relates to a dispensing container and more specifically to a device for storing and individually dispensing small batteries, particularly of the type used with hearing aids.

It is important that batteries for a hearing aid be available upon short notice, since failure of the hearing aid at inopportune times could result in severe inconvenience to the user. The ability to conveniently carry these batteries in pocket or purse for appropriate periods without adverse effect upon the batteries, combined with the ability to have the battery readily available for use, is a significantly desirable advantage. However, in achieving this result it is important that certain problems be overcome. Premature discharge of the batteries by short circuiting must be avoided, as well as inadvertent dispensing of the batteries while being carried in pocket or purse. Furthermore, the dispenser must be simple in structure and economical to manufacture, since the nature of the item is such that commercial success will depend to a significant degree upon cost.

Accordingly, it is an object of the present invention to provide an improved dispensing container for hearing aid batteries which will afford significant advantages such as those discussed above, while overcoming and avoiding many of the potential problems.

Briefly, the present invention may be described as comprising a pair of interfitting circular members containing batteries therebetween, said members being relatively rotatable whereby the batteries are dispensed individually through an opening in one of the members. Additionally, openings in one member aligned with each of said batteries on one side thereof, and a foil sheet positioned on the opposite side of the batteries in the other member, permit testing of the batteries while in the dispenser.

A better understanding of the invention may be had by reference to the following detailed description of a preferred embodiment thereof taken in connection with the accompanying drawing wherein;

FIG. 1 is an isometric view of the assembled battery dispenser of the present invention;

FIG. 2 is an isometric view showing the individual components of the dispenser prior to assembly; and FIG. 3 is a cross-sectional view taken along line 3—3.

Referring now to the drawings, FIG. 1 shows an assembled battery dispenser according to the present invention made of transparent cellulose acetate and having batteries 10 stored therein. Although the specific embodiment described herein is formed of transparent cellulose acetate, other suitable materials such as those categorized as thermoplastic resinous plastics, e.g., polyethylene, polypropylene, etc., may be utilized. The dispenser is formed in three parts and comprises an annular bottom member 12, a sheet insert 28 and an upper revolvable member 52. The annular bottom member 12 has an outer circular rim 14, which is discontinuous for a small portion of its circumference thereby forming a pair of upstanding side walls 16, and a flat annular bottom portion 18 including an integral upstanding lip 20 positioned in proximity to the walls 16. A centrally located inner circular rim 22 is mounted onto bottom portion 18 and includes three vertically extending notches 24. The inner wall 26 of the inner circular rim 22 defines an opening which extends through the bottom portion 18.

The sheet insert 28 is adapted to fit within member 12 and comprises an annular portion 30 and a folded portion 32. The annular portion 30 includes an outer edge 34 which is adapted to fit within the inner wall 36 of outer rim 14. An inner circular edge 38 fits around inner circular rim 22 and a slot 40 is adapted to have lip 20 extend therethrough. Sections 30 and 32 of insert 28 are joined together along a perforated juncture 42, and, as shown in FIG. 1, when the dispenser of the present invention is assembled, the juncture 42 is aligned with the upstanding walls 16 so that the folded portion 32 extends exteriorly of the dispenser. The surface 44 of annular section 30 and the surface 46 of the folded section 32 comprise a surface of electrically conductive material the function of which will be explained hereinafter. Section 32 is folded along dotted line 33, and the end thereof opposite the perforated juncture 42 includes a tab 48 and a diagonal edge 50 the purposes of which will also be explained hereinafter.

The upper revolvable member 52 includes a central hollow cap 54 defining a cylindrical inner surface 56 with a groove 58 formed therein. A plurality of triangular ribs 60 extend radially from the cap 54 and divide the member 52 into a plurality of radial segments 62. Each radial segment 62 has a opening therethrough defined by cylindrical side walls 64. A plurality of rectangular ribs 66 are formed on the under side of member 52, with each rib 66 being aligned with a rib 60.

The assembled dispenser depicted in FIG. 1 is arranged with the insert 28 placed within the bottom member 12. Edge 38 surrounds inner rim 22 with edge 30 lying within outer rim 14. The insert 28 is placed against the bottom portion 18 of member 12 with slot 40 aligned with lip 20 which extends therethrough. The perforated edge 42 is situated between, and aligned with, side walls 16 so that folded portion 32 extends exteriorly of the member 12. The batteries 10 are positioned upon the insert 28 and are distributed over the annular surface 44 thereof.

Upper revolvable member 52 encloses the batteries 10 within the bottom member 12 and is positioned with the central rim 22 extending into, and surrounded by, the cap member 54. The outer surface 27 of rim 22 has a diameter which is approximately equal to, or possibly slightly greater than, the inner surface 56 of cap member 54, but which permits the surface 56 to be placed over and around the outer surface 27. The notches 24 allow the rim 22 to flex slightly inwardly, and the groove 58 tends to limit the extent to which the rim 22 may be inserted into the cap member 54 by acting as a stop means whereby the upper edge 25 of rim 22 abuts and is aligned with the groove 58. Frictional engagement between the outer surface 27 of rim 22 and the inner surface 56 of cap member 54 permits the cap member 54 to be snugly retained upon the rim 22, and in this position the outer edge 53 is radially within the rim 14 and in approximate alignment with the upper edge 15 thereof. The snugness of the fit is such, however, that rotation of upper member 52 relative to bottom member 12 is conveniently permitted.

The batteries are arranged within the dispenser so that one battery is provided in each segment 62. Accordingly, it will be seen that a battery 10 will be positioned on either side of the ribs 60, 66.

In order to dispense a battery from the container it is necessary merely to rotate the upper member 52. The triangular ribs 60 facilitate this rotation in that they provide means for adequately gripping the upper member 52. When the upper member 52 is rotated the ribs 66 will each engage a battery and propel the battery in the direction of rotation of member 52. In the embodiment shown, the direction of rotation of member 52 must be clock-wise. With clock-wise rotation of member 52, the battery 10 closest to lip 20 will be propelled by a rib 66 against the lip 20, whereby the battery will be deflected and directed radially outwardly of the dispenser to pass between the side walls 16 to the user. Continued rotation in a clock-wise direction of the upper member 52 will produce individual dispensing of all the batteries in the dispenser in a similar manner.

It should be noted that the notches 24 do not extend across the complete width of the rim 22. As a result, axial pressure tending to compress together the members 12 and 52 operates to inhibit relative rotation therebetween. With the rim 22 being driven further into the cap member 54, a less resilient portion of the rim 22 is engaged by the inner surface 56 and the fit between the cap 54 and rim 22 becomes tighter. Accordingly, the tendency towards inadvertent dispensing of a battery is lessened by compression of the dispenser while being carried in pocket or purse, where application of a compressive force would be likely under normal circumstances.

The insert 28 provides several significant advantages. The folded portion 32 may be utilized by a vendor of the dispenser for identification purposes by imprinting thereon appropriate data including directions for using the dispenser, as well as advertising subject matter or other information which may enhance the marketability of the item. Furthermore, with the portion 32 in its folded position, the tab 48 may be inserted between the upstanding side walls 16 thereby further preventing inadvertent dispensing of a battery 10. The tab 48 will block the battery passage provided between the sides 16 thereby preventing movement of a battery therethrough and impeding rotation of the upper member 52.

Testing of the batteries while in the dispenser may be accomplished by insertion of a testing probe (not shown) through the opening 64 to make contact with one side of the battery 10. A connection to the other end of such a probe is then completed from the opposite side of the battery 10 through the conductive surfaces 44 and 46 to a probe placed against the surface 46 at a point alongside the diagonal edge 50 which facilitates such contact.

From the foregoing it will be seen that the present invention provides a hearing aid battery dispenser featuring several improvements and advantages. Inadvertent dispensing of a battery is significantly reduced and virtually eliminated. Battery testing is facilitated while at the same time inadvertent short circuiting of a battery prior to use is prevented. These advantages, furthermore, are provided in a dispenser structure which is easy to manufacture and assemble and which features simplicity and economy of construction.

What is claimed is:
1. A battery dispenser comprising a first circular member having a first rim about the outer periphery thereof, said rim being discontinuous over a portion of said periphery sufficient to permit passage of batteries between the ends thereof, an upstanding lip mounted proximate one end of said rim, a second rim mounted on said first member radially inwardly from said first rim, an electrically conductive member overlying a side of said first member between said first and second rims, a second member having a central hollow cap portion including gripping means positioned concentric with said second rim and in rotatable frictional engagement therewith, a plurality of radially extending ribs mounted on said second member and engaging said batteries whereby relative rotation of said first and second members effects movement of said batteries into abutment with said upstanding lip and deflection thereof to between the ends of said first rim and a plurality of cylindrical walls defining openings through said second member whereby electrical contact with said batteries for testing is enabled.

2. A dispenser according to claim 1 comprising a sheet insert positioned between said first member and said batteries with a detachable portion of said insert extending through and between the ends of said first rim to the exterior of said dispenser.

3. A dispenser according to claim 1 wherein said openings are adapted to permit an electrical probe inserted therethrough to contact one side of said battery, with said electrically conductive surface contacting the opposite side of said batteries and extending to exteriorly of said dispenser whereat an electrical circuit contact can be made.

4. A dispenser according to claim 2 wherein said insert on the portion thereof which extends exteriorly of said dispenser includes a tab member positionable between the ends of said first rim thereby to block passage of said batteries therethrough.

5. A dispenser according to claim 1 wherein said second rim is slotted over a portion of its width.

6. A dispenser according to claim 1 wherein ribs positioned on the exterior surface of said dispenser provide gripping means to enhance relative rotatability of said first and second members.

7. A dispenser according to claim 2 wherein said insert on the portion thereof which extends exteriorly of the dispenser provides means for accommodating printed matter.

8. A dispenser according to claim 1 made from transparent thermoplastic synthetic organic resinous material.

References Cited

UNITED STATES PATENTS

| 520,095 | 5/1894 | Turney | 221—79 |
| 1,680,130 | 8/1928 | Connor | 221—82 |
| 3,109,556 | 11/1963 | Scibelli | 221—80 |

FOREIGN PATENTS

| 302,733 | 10/1965 | Netherlands. |
| 96,670 | 8/1939 | Sweden. |

WALTER SOBIN, *Primary Examiner.*